(12) United States Patent
Chen et al.

(10) Patent No.: US 11,234,423 B2
(45) Date of Patent: Feb. 1, 2022

(54) DOUBLE BRAKE STRUCTURE, LOW-PROFILE REEL, AND FISHING TACKLE

(71) Applicant: SHENZHEN BOSAIDONG TECHNOLOGY CO., LTD., Shenzhen (CN)

(72) Inventors: Hong Chen, Shangrao (CN); Yingdong Qi, Guangzhou (CN)

( * ) Notice: Subject to any disclaimer, the term of this patent is extended or adjusted under 35 U.S.C. 154(b) by 0 days.

(21) Appl. No.: 16/898,467

(22) Filed: Jun. 11, 2020

(65) Prior Publication Data
US 2021/0329897 A1     Oct. 28, 2021

(30) Foreign Application Priority Data
Apr. 24, 2020   (CN) .......................... 202010335030.3

(51) Int. Cl.
*A01K 89/01*     (2006.01)
*A01K 89/033*    (2006.01)

(52) U.S. Cl.
CPC .................................. *A01K 89/033* (2013.01)

(58) Field of Classification Search
CPC .............. A01K 89/033; A01K 89/0155; A01K 89/01555; A01K 89/01557
See application file for complete search history.

(56) References Cited

U.S. PATENT DOCUMENTS

| | | | | |
|---|---|---|---|---|
| 5,318,245 A * | 6/1994 | Sato | .................. | A01K 89/0155 188/164 |
| 5,996,920 A * | 12/1999 | Yamaguchi | ...... | A01K 89/01557 242/286 |
| 6,086,005 A * | 7/2000 | Kobayashi | ....... | A01K 89/01555 242/288 |
| 6,126,105 A * | 10/2000 | Yamaguchi | ...... | A01K 89/01555 242/288 |
| 9,999,210 B1 * | 6/2018 | Kim | ..................... | A01K 89/056 |
| 2002/0063181 A1 * | 5/2002 | Yamaguchi | ............ | A01K 89/05 242/286 |
| 2005/0178872 A1 * | 8/2005 | Hyun | ................. | A01K 89/0155 242/611 |
| 2009/0026300 A1 * | 1/2009 | Tsutsumi | ......... | A01K 89/01555 242/288 |
| 2009/0127367 A1 * | 5/2009 | Tsutsumi | ......... | A01K 89/01555 242/286 |

(Continued)

FOREIGN PATENT DOCUMENTS

JP       07274782 A  * 10/1995  ....... A01K 89/01555

*Primary Examiner* — Emmanuel M Marcelo

(57) ABSTRACT

A double brake structure includes a line reel rotatably provided, at least one set of centrifugal pin, a centrifugal brake ring movably provided in the centrifugal brake ring, a centrifugal assembly for making the centrifugal pin be close to an inner wall of the centrifugal brake ring and making the centrifugal pin rotate in the centrifugal brake ring when the line reel is rotating, and for automatically adjusting the kinetic friction force between the centrifugal pin and the inner wall of the centrifugal brake ring according to the speed of the line reel when the centrifugal pin contacts with the inner wall of the centrifugal brake ring, and a magnetic brake mechanism for adjusting the speed of the line reel. The present disclosure is easy to use with stable brake performance, and can achieve the function of automatic compensatory braking.

17 Claims, 2 Drawing Sheets

(56) References Cited

U.S. PATENT DOCUMENTS

| | | | |
|---|---|---|---|
| 2011/0073697 A1* | 3/2011 | Koh | A01K 89/01555 242/288 |
| 2015/0014460 A1* | 1/2015 | Hyun | A01K 89/0155 242/289 |
| 2016/0037759 A1* | 2/2016 | Ikebukuro | A01K 89/01555 242/288 |
| 2016/0235048 A1* | 8/2016 | Ikebukuro | A01K 89/045 |

* cited by examiner

DOUBLE BRAKE STRUCTURE, LOW-PROFILE REEL, AND FISHING TACKLE

TECHNICAL FIELD OF THE INVENTION

The disclosure relates to the field of fishing tackle, in particular, relates to a double brake structure, a low-profile reel, and a fishing tackle.

BACKGROUND OF THE INVENTION

The centrifugal brake structure of the low-profile reel double brake system in the art is the general "lever" centrifugal pins provided on the spool in the industry. When it needs a centrifugal braking, you need to manually pull the centrifugal pins. When the spool is rotating with a certain angular speed, the centrifugal pins, under the centrifugal force of the centrifugal spool, will be thrown out and rub with the metal ring to brake.

Therefore, the centrifugal brake structure of the low-profile reel in the art is inconvenient to use and cannot achieve the function of automatic compensation brake, because the centrifugal pins need to be manually triggered to achieve centrifugal brake performance.

SUMMARY OF THE INVENTION

The purpose of the embodiment of the present disclosure is to provide a double brake structure to solve the problems raised in the background of the invention.

The embodiment of the present disclosure is implemented in this way, a double brake structure includes a line reel rotatably provided and at least one set of centrifugal pin, further includes:
  a centrifugal brake ring movably provided in the centrifugal brake ring;
  a centrifugal assembly for making the centrifugal pin be close to an inner wall of the centrifugal brake ring and making the centrifugal pin rotate in the centrifugal brake ring when the line reel is rotating, and for automatically adjusting the kinetic friction force between the centrifugal pin and the inner wall of the centrifugal brake ring according to the speed of the line reel when the centrifugal pin contacts with the inner wall of the centrifugal brake ring; and
  a magnetic brake mechanism for adjusting the speed of the line reel, and for automatically producing a magnetic induction force opposite to a rotating direction of the line reel when the line reel is rotating.

Further, the centrifugal assembly includes:
  a centrifugal seat connected with the line reel for supporting the centrifugal pin; and
  at least one set of centrifugal elastic piece corresponding to the centrifugal pin, and movably provided on the centrifugal seat through the centrifugal elastic piece.

Further, the elastic force direction of the centrifugal elastic piece is perpendicular to an axis of the line reel.

Further, an axis of the centrifugal seat coincides with the axis of the line reel; at least one set of chute corresponding to the centrifugal pin is provided on the radial direction of the centrifugal seat; one end of the centrifugal pin is provided in the chute, and connected with the centrifugal seat by the centrifugal elastic piece.

Further, the magnetic brake mechanism includes:
  a magnetic ring for generating magnetic line of force;
  a magnetic piece connected with the line reel and located in the magnetic ring; when the line reel rotates, the magnetic piece cuts the magnetic line of force generated by the magnetic ring to produce a magnetic induction force opposite to the rotation direction of the line reel; and
  an adjustment assembly for driving the magnetic ring to move along an axial direction thereof in order to change the magnetic induction force produced by cutting the magnetic line of force of the magnetic unit.

Further, the adjustment assembly includes:
  a magnet base provided with the magnetic ring and movably provided on one side of the line reel for supporting the magnetic ring;
  a press piece connected with the magnet seat;
  a reset elastic piece; the press piece is connected with the line reel seat by the reset elastic piece, and the line reel seat is fixedly provided on one side of the line reel and rotatably connected with the axis of the line reel; and
  a magnetic adjusting knob for exerting pressure on the press piece to make the press piece move in straight line along the axial direction of the magnetic ring.

Further, the magnetic adjusting knob is provided with a thread, the magnetic adjusting knob is threadedly connected with the side cover, and the side cover is fixedly provided on one side of the press piece.

Further, the magnetic ring comprises several groups of magnets; the several groups of magnets are circularly distributed and all of them are curved structures The embodiment of the present disclosure further provides a low-profile reel including a fishing vessel body and the double brake structure.

The embodiment of the present disclosure further provides a fishing tackle comprising the low-profile reel.

The embodiment of the present disclosure provides a double brake structure, which is easy to use with stable brake performance, and can achieve the function of automatic compensatory braking. Due to the centrifugal assembly, the rotation of the line reel rotation can drive the centrifugal pin to move centrifugally, so that centrifugal pin contacts with the inner wall of the centrifugal brake ring to generate the friction for the purpose of braking. At the same time, with the change of the speed of the line reel, the friction between the centrifugal pin and the inner wall of the centrifugal brake ring will change, thus realizing the purpose of automatically adjusting the braking force performance. In addition, because of the magnetic brake mechanism, the embodiment of the present disclosure further can achieve the purpose of double braking so as to improve the stability of the brake. Specifically, due to the magnetic ring spliced according to the way of magnetic pole staggered and seamless, the embodiment of the present disclosure can improve the stability of the magnetic induction force generated by cutting magnetic line of force of the magnetic piece, thereby improving the stability of magnetic braking.

REFERENCE NUMERALS

1—fishing vessel body, 2—line reel body, 21—first fastening screw, 22—fixed plate, 23—centrifugal pin, 24—centrifugal elastic piece, 25—centrifugal seat, 26—magnetic piece, 27—line reel, 3—side cover body, 31—magnetic adjusting knob, 32—side cover, 33—second fastening screw, 34—press piece, 35—reset elastic piece, 36—line reel seat, 37—third fastening screw, 38—centrifugal brake ring, 39—magnet seat, 40—magnet.

DETAILED DESCRIPTION OF THE EMBODIMENTS

In order to make the purpose, technical solution and advantages of the disclosure more clearly, the disclosure, combined with drawings and embodiments, will be further detailed. It should be understood that the specific embodiments described herein are intended only to explain the disclosure and are not intended to qualify the disclosure.

In addition, in the description of the application, the terminology used should be understood in a broad sense, and for the technical staff in the field, the specific meaning of the term may be understood in the context of the actual circumstances. For example, the terms "provide" and "arrange" used in this application may be defined as contact settings or contactless settings, etc., and the azimuth terms used are based on reference sits or in the direction defined by the actual situation and common sense.

Figure 1:
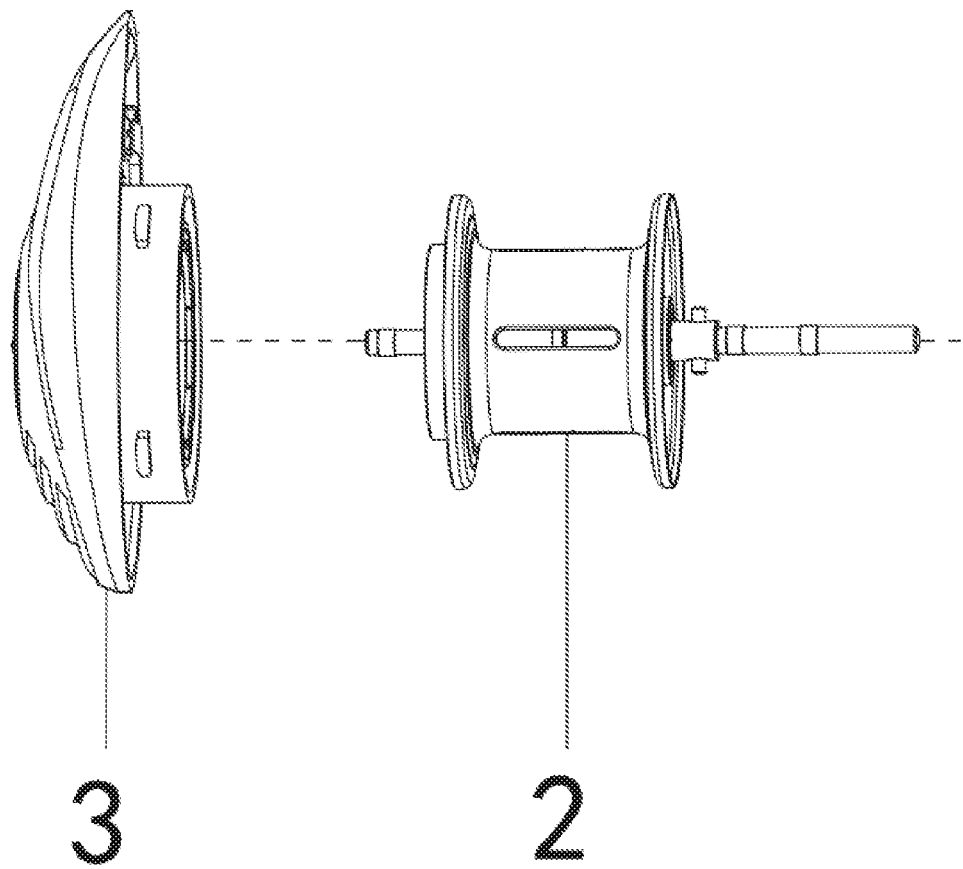
FIG. 1 is an explosive drawing of a double brake structure provided by the embodiment of the present disclosure.
Figure 2:
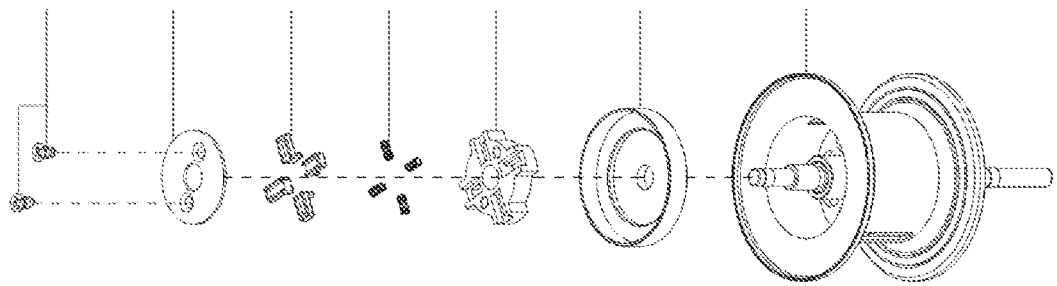
FIG. 2 is an explosive drawing of a line reel body provided by the embodiment of the present disclosure.
Figure 3:
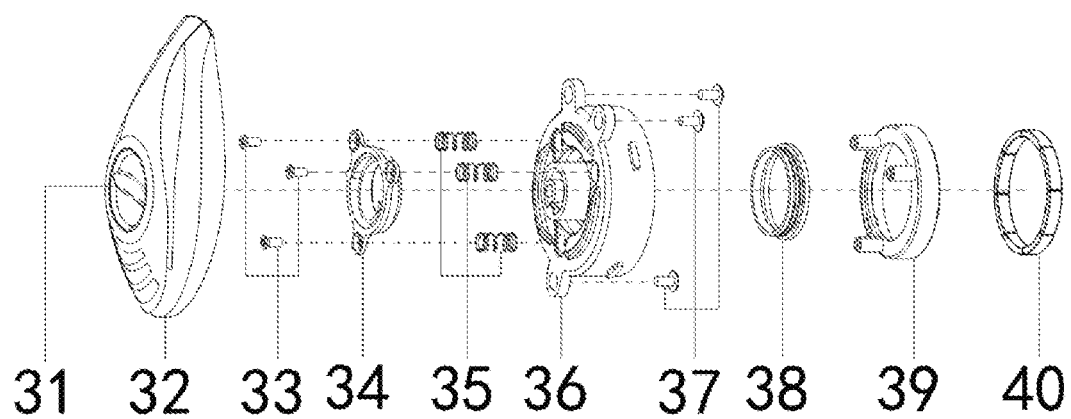
FIG. 3 is an explosive drawing of a side cover body provided by the embodiment of the present disclosure.

As shown in FIGS. 1 to 3, in one embodiment of the present disclosure, it provides a double brake structure, which includes:
  a line reel 27 rotatably provided;
  at least one set of centrifugal pin 23;
  a centrifugal brake ring 38 movably provided in the centrifugal brake ring 38;
  a centrifugal assembly for making the centrifugal pin 23 be close to an inner wall of the centrifugal brake ring 38 and making the centrifugal pin 23 rotate in the centrifugal brake ring 38 when the line reel 27 is rotating, and for automatically adjusting the kinetic friction force between the centrifugal pin 23 and the inner wall of the centrifugal brake ring 38 according to the speed of the line reel 27 when the centrifugal pin 23 contacts with the inner wall of the centrifugal brake ring 38; and
  a magnetic brake mechanism for adjusting the speed of the line reel 27, and for automatically producing a magnetic induction force opposite to a rotating direction of the line reel 27 when the line reel 27 is rotating.

In practical application, the double brake structure could be a brake structure of a low-profile reel, which consists of a line reel body 2 and a side cover body 3. Wherein, the line reel body 2 includes the line reel 27, the centrifugal pin 23, and the centrifugal assembly. The side cover body 3 includes the centrifugal brake ring 38 and the magnetic brake mechanism. In addition, the centrifugal pin could be provided with four groups, but not limited to this, four groups of centrifugal pins 23 are circular distribution. The centrifugal brake ring 38 could be made of metal.

Due to the centrifugal assembly, the embodiment of the present disclosure could make the centrifugal pin 23 rotate when the line reel 27 is rotating, so that the centrifugal pin 23 contacts with the inner wall of the centrifugal brake ring 38 to produce a friction for braking. At the same time, with the change of the speed of the line reel 27, the friction between the centrifugal pin 23 and the inner wall of the centrifugal brake ring 38 will change, thus realizing the purpose of automatically adjusting the performance of braking force. In addition, due to the magnetic brake mechanism, the embodiment of the present disclosure further could realize the purpose of double braking in order to improve the stability of the brake.

As shown in FIG. 2, as a preferred solution for the embodiment of the present disclosure, the centrifugal assembly includes:
  a centrifugal seat 25 connected with the line reel 27 for supporting the centrifugal pin 23; and
  at least one set of centrifugal elastic piece 24 corresponding to the centrifugal pin 23, and movably provided on the centrifugal seat 25 through the centrifugal elastic piece 24.

Specifically, the centrifugal seat 25 is a disk-shaped structure, the center position thereof is fixedly connected with the axis of the line reel 27. The centrifugal elastic piece 24 could be provided in a group of four, but not limited to this, the group of four centrifugal elastic pieces 24 could be in a circular distribution. Because of the centrifugal elastic pieces 24, the centrifugal pin 23 can be driven to make a centrifugal movement by the rotation of the line reel 27 and the centrifugal seat 25, so that the centrifugal pin 23 can contact the inner wall of the centrifugal brake ring 38.

As shown in FIG. 2, as another preferred solution of the embodiment of the present disclosure, the elastic force direction of the centrifugal elastic piece 24 is perpendicular to an axis of the line reel 27.

Specifically, the centrifugal elastic piece 24 could use a spring, the elastic direction is the radial direction of the centrifugal seat 25 to ensure the centrifugal movement of the centrifugal pin 23.

As shown in FIG. 2, as another preferred solution of the embodiment of the present disclosure, an axis of the centrifugal seat 25 coincides with the axis of the line reel 27. At least one set of chute corresponding to the centrifugal pin 23 is provided on the radial direction of the centrifugal seat 25. One end of the centrifugal pin 23 is provided in the chute, and connected with the centrifugal seat 25 by the centrifugal elastic piece 24.

Specifically, the radial direction of centrifugal seat 25 could provide with four groups of chutes with square structure, but not limited to this. The centrifugal pin 23 is an "L"-shaped structure, one end thereof is slidably provided in the chute and fixedly connected with one end of the centrifugal elastic piece 24. Another end of the centrifugal elastic piece 24 is fixedly connected with the centrifugal seat 25. In addition, one side of the centrifugal seat 25 further could be fixed with a fixed plate 22 through a first fastening screw 21, and the centrifugal pin 23 is located between the fixed plate 22 and the centrifugal seat 25. The position of centrifugal pin 23 in the axial direction of the centrifugal seat 25 could be limited through the fixed plate 22.

The line reel 27 rotating with the fish line will drive the centrifugal seat 25 to rotate, and the rotation of the centrifugal seat 25 will drive the centrifugal pin 23 to rotate. At the same time, the centrifugal pin 23 will be thrown out of the centrifugal seat 25 under the centrifugal force of the rotation, and contacts with the inner wall of the centrifugal brake ring 38 to create the friction for suppressing the rotation of the line reel 27 and braking. In addition, when the speed of the line reel 27 changes, the centrifugal force on the centrifugal pin 23 will also change. At this time, the friction between the centrifugal pin 23 and the inner wall of the centrifugal brake ring 38 will also change accordingly so as to automatically adjust the brake force.

As shown in FIGS. 2 and 3, as another preferred solution of embodiments of the present disclosure, the magnetic brake mechanism includes:

a magnetic ring for generating magnetic line of force;

a magnetic piece 26 connected with the line reel 27 and located in the magnetic ring; when the line reel 27 rotates, the magnetic piece 26 cuts the magnetic line of force generated by the magnetic ring to produce a magnetic induction force opposite to the rotation direction of the line reel 27; and an adjustment assembly for driving the magnetic ring to move along an axial direction thereof in order to change the magnetic induction force produced by cutting the magnetic line of force of the magnetic unit 26.

Specifically, the magnetic piece 26 could be a disk-shaped structure with a groove, the centre position thereof is fixedly connected with the axis of the line reel 27. In order to save space, the centrifugal seat 25 could be provided in the groove of the magnetic piece 26.

As shown in FIG. 3, as another preferred solution of the embodiment of the present disclosure, the adjustment assembly includes:

a magnet base 39 provided with the magnetic ring and movably provided on one side of the line reel 27 for supporting the magnetic ring;

a press piece 34 connected with the magnet seat 39;

a reset elastic piece 35; the press piece 34 is connected with the line reel seat 36 by the reset elastic piece 35, and the line reel seat 36 is fixedly provided on one side of the line reel 27 and rotatably connected with the axis of the line reel 27; and a magnetic adjusting knob 31 for exerting pressure on the press piece 34 to make the press piece 34 move in straight line along the axial direction of the magnetic ring.

Specifically, the side cover body 3 further includes a side cover 32 and a line reel seat 36, the side cover 32 is fixedly provided on one side of the line reel 27, the line reel seat 36 could be fixedly mounted on a side of the side cover 32 close to the line reel 27 by a third fastening screw 37, and the axis of the line reel 27 is rotatably provided on the line reel seat 36. In addition, the magnet seat 39 is a ring structure, a guide column could be provided on the ring, the line reel seat 36 could be provided with a guide through hole for slidably matching with the guide column. The guide column on the magnet seat 39 could be fixedly connected with the press piece 34 through the guide through hole on the line reel seat 36, specifically secured by a second fastening screw 33. The reset elastic piece 35 could be a spring, two ends thereof are connected with the press piece 34 and the line reel seat 36 respectively. In addition, the magnetic adjusting knob 31 is provided on the side cover 32, the press piece 34 is located between the magnetic adjusting knob 31 and the line reel seat 36. The magnetic adjusting knob 31 could be a screw, or telescopic rod, or other structures.

As shown in FIG. 3, as another preferred solution of the embodiment of the present disclosure, the magnetic adjusting knob 31 is provided with a thread, the magnetic adjusting knob 31 is threadedly connected with the side cover 32, and the side cover 32 is fixedly provided on one side of the press piece 34.

Specifically, the magnetic adjusting knob 31 could be a screw structure with an external thread. The side cover 32 is provided with an threaded hole with internal thread that matches the external thread, and the magnetic adjusting knob 31 is threaded with the side cover 32. When the magnetic brake force needs to be increased, the magnetic adjusting knob 31 is turned to drive the magnetic adjusting knob 3 to move close to the press piece 34 for increasing the pressure on the press piece 34 by the magnetic adjusting knob 31. Therefore, the press piece 34 can drive the magnet seat 39 and the magnetic ring to move along the axis of the magnetic ring, and press the reset elastic piece 35. At this time, the magnetic ring could be close to the magnetic piece 26. Therefore, when the magnetic piece 26 is rotating, the number of magnetic line of force being cut will increase so as to increase the magnetic induction force for increasing the braking force. When the magnetic brake force needs to be decreased, the magnetic adjusting knob 31 is turned reversely to drive the magnetic adjusting knob 31 to move away from the press piece 34 for decreasing the pressure on the press piece 34 by the magnetic adjusting knob 31. Therefore, the press piece 34 can move away from the magnetic piece 26 under the function of reset elastic piece 35, so that the number of magnetic line of force being cut by the rotation of magnetic piece 26 will decrease so as to decrease the magnetic induction force for decreasing the braking force.

As shown in FIGS. 2 and 3, as another preferred solution of embodiments of the present disclosure, the magnetic ring includes a group of magnets 40. The group of magnets 40 are circularly distributed and all of them are curved structures.

Specifically, the magnet 40 could be provided with eight groups, but not limited to this. The eight groups of magnets 40 are spliced to form a ring structure of the magnetic ring, according to the way of magnetic pole staggered and seamless.

Figure 4:
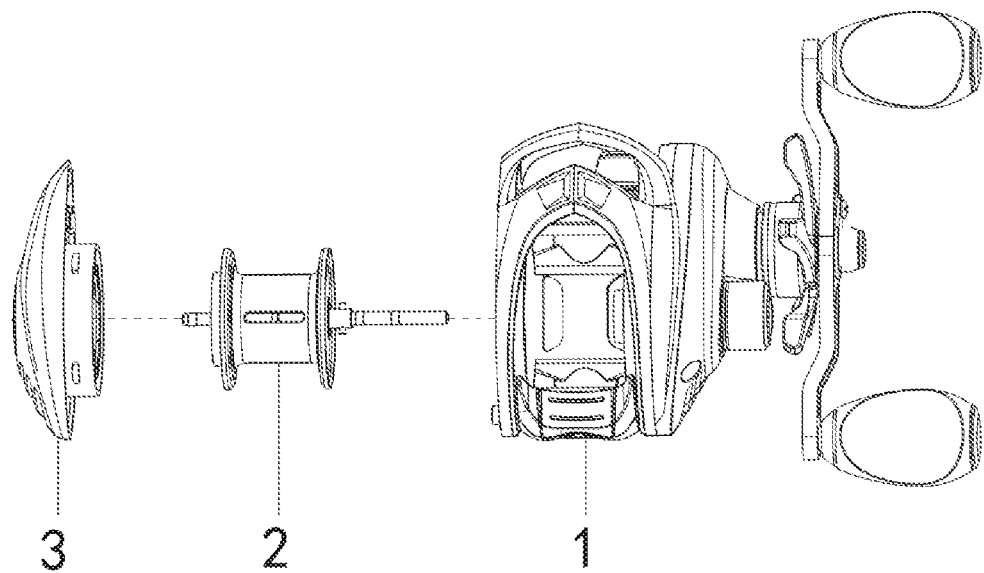
FIG. 4 is an explosive drawing of a low-profile reel provided by the embodiment of the present disclosure.

As shown in FIG. 4, in another embodiment of the present disclosure, it provides a low-profile reel, which includes a fishing vessel body 1 and the double brake structure.

Specifically, the structure of the low-profile reel could consist of three parts: the fishing vessel body 1, the line reel body 2, and the side cover body 3. The structure of the line reel body 2 and the side cover body 3 is the same as the structure of the above embodiment, and the structure of the fishing vessel body 1 may be the same as the structure of the common low-profile reel in the art. The line reel body 2 could be assembled in the fishing vessel body 1, the side cover body 3 could be connected with the fishing vessel body 1 so that the line reel body 2 is located between the fishing vessel body 1 and the side cover body 3.

In another embodiment of the present disclosure, it provides a fishing tackle, which includes the low-profile reel.

Specifically, the structure of the fishing tackle could be the same as the structure of the common fishing tackle in the art except the structure of the low-profile reel, for example, it could be provided with a fishing rod, fish line, etc., here is not to be repeated.

In summary, the embodiment of the present disclosure provides the fishing tackle and the low-profile reel in use. When the fishing vessel body 1 is used to cast bait, the line reel 27 will rapidly rotate with the fish line. At this time, the centrifugal pin 23 will contact with the inner wall of the centrifugal brake ring 38 to generate the friction under the function of the centrifugal force for braking. At the same time, the rotation of the line reel 27 could drive the magnetic piece 26 to rotate, the rotation of the magnetic piece 26 can cut the magnetic line of force generated by the magnetic ring composed of multiple groups of magnets 40 so as to produce the magnetic induction force opposite to the magnetic piece 26 for the purpose of stable magnetic braking. In addition, with the change of the speed of the line reel 27, the kinetic friction force between the centrifugal pin 23 and the inner wall of the centrifugal brake ring 38 will also automatically change as so to automatically adjust the centrifugal braking force for the function of automatically compensatory braking. At the same time, the axial stroke of the magnetic ring could be adjusted by turning the magnetic adjusting knob 31 to change the magnetic induction force generated by cutting the magnetic line of force of the magnetic ring 26 in the magnetic ring, so that the magnetic brake force can be adjusted.

The embodiments described above represent only a few embodiments of the present disclosure, its description is more specific and detailed, but cannot be understood as a limitation on the scope of the patent of the present disclosure. It should be pointed out that for ordinary technical personnel in the art, without departing from the concept of the present disclosure, you can also make a number of deformations and improvements, these are the scope of protection of the present disclosure. Therefore, the scope of protection of the patent of the present disclosure shall be subject to the attached claim.

What is claimed is:

1. A double brake structure comprising:
    a rotatable line reel;
    a set of at least one centrifugal pin;
    a centrifugal brake ring, wherein the at least one centrifugal pin is movably arranged in the centrifugal brake ring;
    a centrifugal assembly configured for pushing the at least one centrifugal pin towards an inner wall of the centrifugal brake ring and driving the at least one centrifugal pin to rotate in the centrifugal brake ring when the line reel is rotating, and for automatically adjusting a kinetic friction force between the at least one centrifugal pin and the inner wall of the centrifugal brake ring depending on a speed of the line reel when the at least one centrifugal pin is in contact with the inner wall of the centrifugal brake ring; and
    a magnetic brake mechanism configured for hindering the rotation of the line reel, and for automatically producing a magnetic induction force opposite to a rotating direction of the line reel when the line reel is rotating;
    wherein the centrifugal assembly comprises:
    a centrifugal seat connected with the line reel and configured for supporting the at least one centrifugal pin; and
    a set of at least one centrifugal elastic piece corresponding to the at least one centrifugal pin, and movably disposed on the centrifugal seat through the at least one centrifugal elastic piece.

2. The double brake structure according to claim 1, wherein an elastic force direction of the at least one centrifugal elastic piece is perpendicular to an axis of the line reel.

3. The double brake structure according to claim 2, wherein an axis of the centrifugal seat coincides with the axis of the line reel; a set of at least one chute corresponding to the at least one centrifugal pin is arranged along a radius of the centrifugal seat; wherein one end of the at least one centrifugal pin is arranged in the corresponding chute, and connected to the centrifugal seat through the at least one centrifugal elastic piece.

4. The double brake structure according to claim 1, wherein the magnetic brake mechanism comprises:
    a magnetic ring configured for generating a magnetic line of force;
    a magnetic piece connected with the line reel and disposed in the magnetic ring; when the line reel is rotating, the magnetic piece cuts the magnetic line of force generated by the magnetic ring to produce a magnetic induction force opposite to the rotation direction of the line reel; and
    an adjustment assembly for driving the magnetic ring to move along an axial direction thereof in order to change the magnetic induction force produced by cutting the magnetic line of force of the magnetic unit.

5. The double brake structure according to claim 4, wherein the adjustment assembly comprises:
    a magnet seat movably arranged on one side of the line reel and configured for supporting the magnetic ring;
    a press piece connected with the magnet seat;
    a reset elastic piece; the press piece is connected with a line reel seat by the reset elastic piece, and the line reel seat is fixedly arranged on one side of the line reel and rotatably connected with a rotary shaft of the line reel; and
    a magnetic adjusting knob for exerting a pressure on the press piece to make the press piece move in a straight line along the axial direction of the magnetic ring.

6. The double brake structure according to claim 5, wherein the magnetic adjusting knob comprises a thread, wherein the magnetic adjusting knob is threadedly connected with a side cover, and the side cover is fixedly provided on one side of the press piece.

7. The double brake structure according to claim 5, wherein the magnetic ring comprises a group of magnets; wherein the group of magnets are circularly distributed and all of them are curved structures.

8. The double brake structure according to claim 4, wherein the magnetic ring comprises a group of magnets; wherein the group of magnets are circularly distributed and all of them are curved structures.

9. A low-profile reel, comprising a fishing vessel body and a double brake structure; wherein the double brake structure comprises:
    a rotatable line reel;
    a set of at least one centrifugal pin;
    a centrifugal brake ring, wherein the at least one centrifugal pin is movably arranged in the centrifugal brake ring;
    a centrifugal assembly configured for pushing the at least one centrifugal pin towards an inner wall of the centrifugal brake ring and driving the at least one centrifugal pin to rotate in the centrifugal brake ring when the line reel is rotating, and for automatically adjusting a kinetic friction force between the at least one centrifugal pin and the inner wall of the centrifugal brake ring depending on a speed of the line reel when the at least one centrifugal pin is in contact with the inner wall of the centrifugal brake ring; and
    a magnetic brake mechanism configured for hindering the rotation of the line reel, and for automatically producing a magnetic induction force opposite to a rotating direction of the line reel when the line reel is rotating;
    wherein the centrifugal assembly comprises:
    a centrifugal seat connected with the line reel and configured for supporting the at least one centrifugal pin; and
    a set of at least one centrifugal elastic piece corresponding to the at least one centrifugal pin, and movably disposed on the centrifugal seat through the at least one centrifugal elastic piece.

10. The low-profile reel according to claim 9, wherein an elastic force direction of the at least one centrifugal elastic piece is perpendicular to an axis of the line reel.

11. The low-profile reel according to claim 10, wherein an axis of the centrifugal seat coincides with the axis of the line reel; a set of at least one chute corresponding to the at least one centrifugal pin is arranged along a radius of the centrifugal seat; wherein one end of the at least one centrifugal pin is arranged in the corresponding chute, and connected to the centrifugal seat through the at least one centrifugal elastic piece.

12. The low-profile reel according to claim 9, wherein the magnetic brake mechanism comprises:
   a magnetic ring configured for generating magnetic line of force;
   a magnetic piece connected with the line reel and disposed in the magnetic ring; when the line reel is rotating, the magnetic piece cuts the magnetic line of force generated by the magnetic ring to produce a magnetic induction force opposite to the rotation direction of the line reel; and
   an adjustment assembly for driving the magnetic ring to move along an axial direction thereof in order to change the magnetic induction force produced by cutting the magnetic line of force of the magnetic unit.

13. The low-profile reel according to claim 12, wherein the adjustment assembly comprises:
   a magnet seat movably arranged on one side of the line reel and configured for supporting the magnetic ring;
   a press piece connected with the magnet seat;
   a reset elastic piece; the press piece is connected with a line reel seat by the reset elastic piece, and the line reel seat is fixedly arranged on the side of the line reel and rotatably connected with a rotary shaft of the line reel; and
   a magnetic adjusting knob for exerting a pressure on the press piece to make the press piece move in a straight line along the axial direction of the magnetic ring.

14. The low-profile reel according to claim 13, wherein the magnetic adjusting knob comprises a thread, wherein the magnetic adjusting knob is threadedly connected with a side cover, and the side cover is fixedly provided on one side of the press piece.

15. The low-profile reel according to claim 13, wherein the magnetic ring comprises a group of magnets; wherein the group of magnets are circularly distributed and all of them are curved structures.

16. The low-profile reel according to claim 12, wherein the magnetic ring comprises a group of magnets; wherein the group of magnets are circularly distributed and all of them are curved structures.

17. A fishing tackle, comprising a low-profile reel; wherein the low-profile reel comprises a fishing vessel body and a double brake structure, wherein the double brake structure comprises:
   a rotatable line reel;
   a set of at least one centrifugal pin;
   a centrifugal brake ring, wherein the at least one centrifugal pin is movably arranged in the centrifugal brake ring;
   a centrifugal assembly configured for pushing the at least one centrifugal pin towards an inner wall of the centrifugal brake ring and driving the at least one centrifugal pin to rotate in the centrifugal brake ring when the line reel is rotating, and for automatically adjusting a kinetic friction force between the at least one centrifugal pin and the inner wall of the centrifugal brake ring depending on a speed of the line reel when the at least one centrifugal pin is in contact with the inner wall of the centrifugal brake ring; and
   a magnetic brake mechanism configured for hindering the rotation of the line reel, and for automatically producing a magnetic induction force opposite to a rotating direction of the line reel when the line reel is rotating;
   wherein the centrifugal assembly comprises:
   a centrifugal seat connected with the line reel and configured for supporting the at least one centrifugal pin; and
   a set of at least one centrifugal elastic piece corresponding to the at least one centrifugal pin, and movably disposed on the centrifugal seat through the at least one centrifugal elastic piece.

* * * * *